United States Patent Office 3,819,777
Patented June 25, 1974

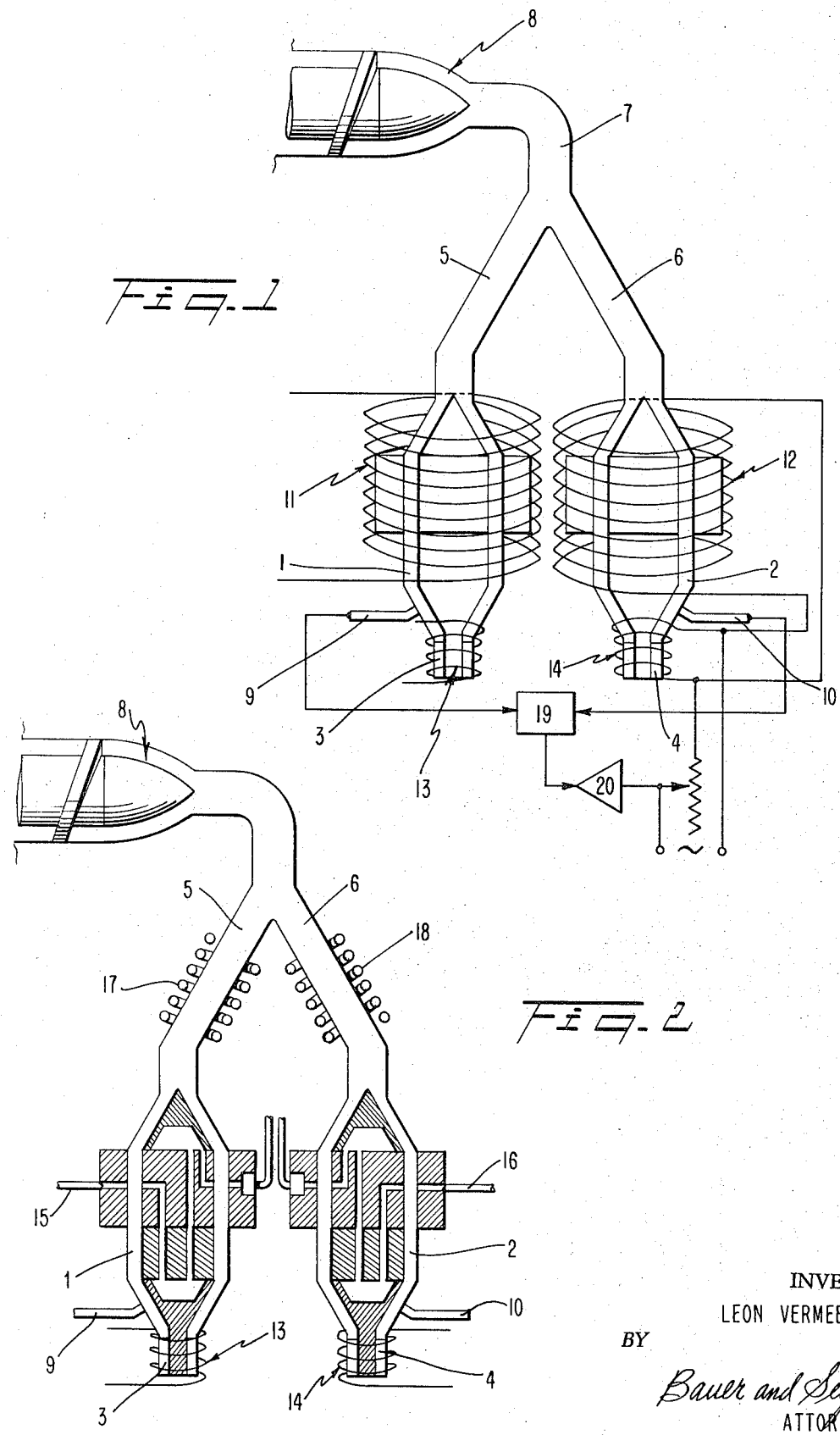

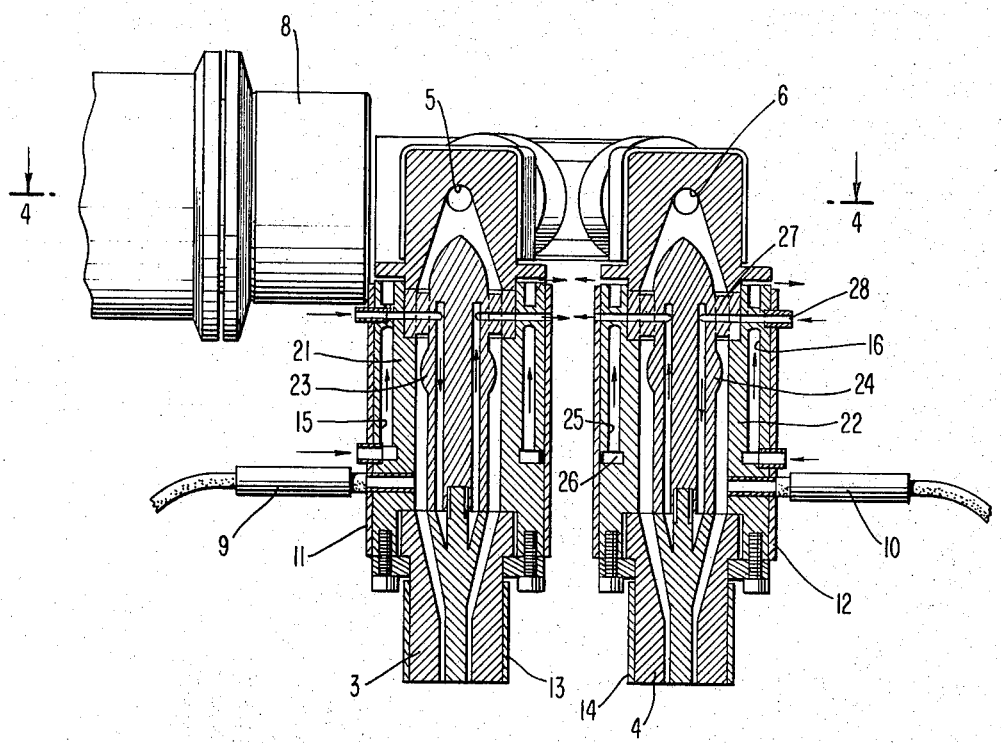
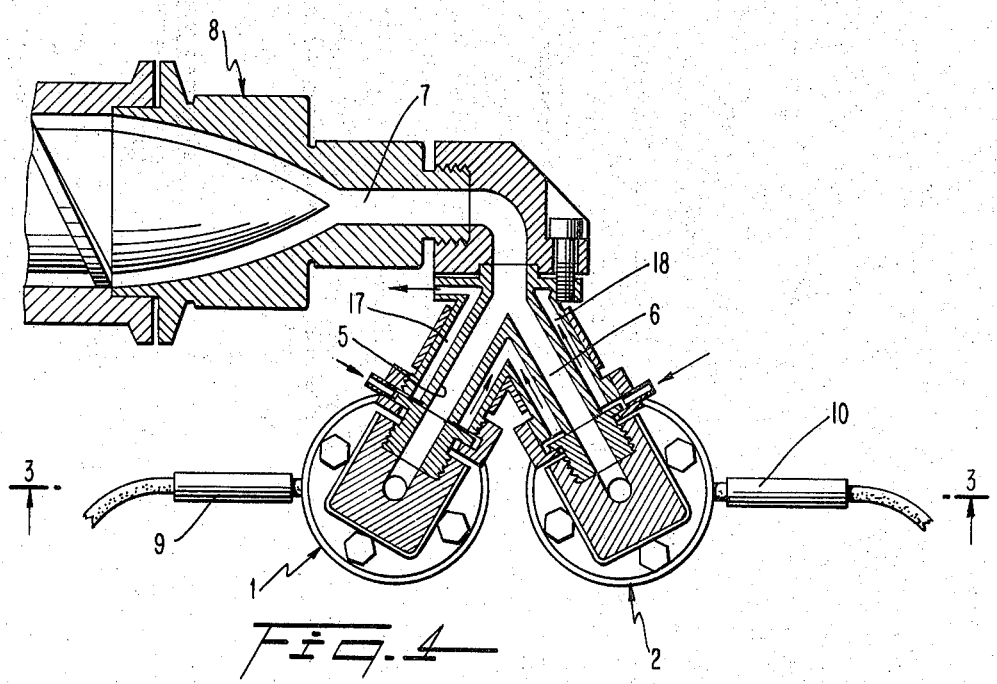

3,819,777
METHOD FOR REGULATING THE MULTIPLE HEAD EXTRUSION OF PLASTIC MATERIALS
Leon Vermeerbergen, Lagnieu, France, assignor to Saint-Gobain Industries, Neuilly-sur-Seine, France
Filed May 27, 1971, Ser. No. 147,479
Claims priority, application France, May 29, 1970, 7019808
Int. Cl. B29d 23/04; B29f 3/08; G01l 7/00
U.S. Cl. 264—40                                       4 Claims

ABSTRACT OF THE DISCLOSURE

Multiple head extrusion apparatus is provided in which the output of all heads is equated to the output of a master head by control of viscosity, the difference in pressure between the master head and the controlled head being used continuously to control a temperature control means which is associated with the controlled head. The temperature control is conveniently by pneumatic cooling and electrical heating of the head, either or both of which can be operated by the difference in pressure.

---

This invention relates to the regulation of the output of multiple-head extruders. It is known that the output of the different extrusion heads in multiple-head extruders are influenced by numerous factors including the temperature of each head, the length of the path traversed by the molten plastic material which supplies each head, and the back pressure adjacent each head so that balancing them is difficult. It is important that the output of the different extrusion heads of a multiple-head extruder shall be regular and identical in order that the shapes issuing from each head shall be similar and that the molded objects, for instance those derived from extrusion blowing such as flasks, shall be identical in their characteristics.

The object of the present invention is to control and regulate the output of the heads of a multiple-head extruder so as to obtain products of identity in form and character.

The novel process is based essentially upon the concept that the viscosity of the molten polymer varies greatly with its temperature, not being constant throughout the length of the path traveled toward the extrusion die, and that it is possible to control flow rate of the molten polymeric resin output by controlling the temperature of the molten polymeric resin.

In conformity with the invention the output of each extrusion head of a multiple-head extruder is continuously regulated so as to make the output equal to the output of a reference head on the same apparatus by comparing the extrusion pressures upstream of the extrusion apertures of the said heads and by using any difference of pressures registered by suitable apparatus as a command signal to activate temperature control means imposed upon the material approaching the filiere.

The temperature regulating means may comprise electrical resistance heaters on the body of the extrusion heads and their corresponding dies. When the extrusion apparatus is operated autothermally or autogenously the voltage applied to the electrical resistance heater may be constant but intermittent in order to supply sufficient heat to overcome the heat loss during such operation. These electrical resistance heaters may be part of the normal equipment for the heads, the supply current for the electrical resistance heaters being varied as a function of the difference of pressure displayed by appropriate instruments between the reference head and the extrusion head, the output of which is to be regulated.

The means for regulating the temperature of the extrusion head, the output of which is to be controlled, may also include, inside the body of the head or at its periphery, supply circuits and cooling circuits through which flows an appropriate cooling medium, for instance air, the pressure and speed of which can be varied as desired. In order to regulate the temperature of the plastic with precision it is possible to combine different types and means of temperature control.

The above and further objects and novel features of the present invention will more fully appear from the following detailed description when the same is read in connection with the accompanying drawings. It is to be expressly understood, hwever, that the drawings are for the purpose of illustration only and are not intended as a definition of the limits of the invention.

In the drawings, wherein like reference characters refer to like parts throughout the several views, FIG. 1 is a schematic diagram illustrating a first form of the invention.

FIG. 2 is a similar view of a second form of the invention. Either of these forms may be preferred under certain conditions.

FIG. 3 is a vertical section on the line 3—3 of FIG. 4 and FIG. 4 is a section on the line 4—4 of FIG. 3, FIGS. 3 and 4 illustrating apparatus in which different control means are combined to achieve equal output of different heads.

For maximum clarity the apparatus represented in the different figures shows only two extrusion heads but the invention is applicable to any number of heads.

On two extrusion heads 1 and 2, equipped with extrusion dies 3 and 4 for extruding plastic thread, and which are supplied with plastic material by conduits 5 and 6 which are themselves supplied from a single conduit 7 which is under pressure from force-feed 8, only a part of which is shown, head 1 is the head of reference and it is desired to continuously control the output of the plastic material of head 2 in order that it shall be equal to that of head 1. In conformity with the invention, pressure meters 9 and 10 measure the pressure upstream of extrusion dies 3 and 4 and the difference in pressure which is registered on a suitable meter is used as a command signal to control the temperature regulating means for the molten polymeric material passing through the head 2.

In the case of the apparatus shown in FIG. 1 these means are constituted by electrical resistance heaters 11 and 12 which respectively enclose heads 1 and 2 and electrical resistance heaters 13 and 14 which enclose extrusion dies 3 and 4. Inasmuch as, as indicated, only the output of head 2 is regulated, the different heads being interchangeable, it is necessary that they be identical and that is the reason why electrical resistance heaters are provided on each of them. The electrical resistance heaters of head 2 may be supplied with electrical current either at constant but intermittent voltage, as a function of the difference of pressures registered by the meters 9 and 10, or with variable voltage varying as a function of the signal sent by the meters 9 and 10.

In the case of FIG. 2 the extrusion dies 3 and 4 are equipped with electrical resistance heaters 13 and 14 but the temperature of the core portion of the extrusion heads 1 and 2 is controlled by refrigeration circuits 15, 16 of known type through which circulates a fluid, for example air. Similarly a cooling conduit 17, 18 is put about the supply conduits 5 and 6. The supply of the cooling conduits may be accomplished either by varying the pressure in the supply line as a function of the difference in pressures between the meters 9 and 10, or at constant pressure upstream of a valve of variable opening the size of which changes according to the signal sent by the meters. The meters 9 and 10 are connected to a resistance-measuring bridge 19 of classic type of which the current of unbalance flows to a regulator 20 to be transformed to a command signal acting on a potentiometer which varies the supply voltages of resistances 12 and 14 as illustrated in FIG. 1. The regulation is proportional-integral-differential of classic type of which the form is related to the structure of the heads and to the nature of the polymer and is readily determined for each particular operation.

FIGS. 3 and 4 are details of a form of the invention of high practical use combining the characteristics of the schematic FIGS. 1 and 2.

The heads include a body 21 and 22 and a core 23, 24, each of which is provided with a cooling circuit formed of parallel canals 25 connected by circular throats 26. The three wings 27 carry the core and are provided with conduits; and the conduits 5 and 6 for the supply of the molten polymeric material are cooled by a third, similar conduit 17, 18. Each conduit is supplied by conduits such as 28 the flow of which is controlled by an expansion valve which furnishes constant pressure, its output being regulated by an independent valve. Because of its simplicity the circuit of blowing air discharging into the axis of the core has not been shown.

The pressure meters 9 and 10 are mounted in appropriate orifices situated in the downstream part of the body. They control the heating current which circulates through the resistances 12 and 14 by means of apparatus 19, 20 shown in FIG. 1. The cooling circuit being regulated once for all, control thereafter is by change in the current through the operation of bridge 19 and variable resistance 20.

In the form of the invention illustrated in FIGS. 3 and 4 the output of extrusion head 2 can be changed rapidly and with great precision, the cooling circuits making it possible to increase the losses of pressure of the molten polymeric material flowing upstream of the extrusion dies, while the heating resistances disposed around them and around the heads accomplish a fine control by reducing such losses of pressure.

As many apparently widely different embodiments of the present invention may be made without departing from the spirit and scope thereof, it is to be understood that the invention is not limited to the specific embodiments.

What is claimed is:

1. A process for continuously controlling the molten polymer outputs of extrusion heads in an apparatus having a plurality of extrusion heads whereby to provide equal output of the heads thereof, which comprises establishing one head as a reference head and measuring the extrusion pressures upstream of the extrusion dies of all of the heads, and using the differences in pressure between the reference head and the heads to be controlled to generate a command signal to activate heating means associated with the heads to be controlled in order to reduce the viscosity of the molten polymer resin flowing therein and thus equalize the overall output of the heads.

2. A process for continuously regulating the molten polymer output of extrusion heads in extrusion apparatus having two extrusion heads which comprises selecting one head as the reference head and the remaining head as the head to be controlled, measuring the pressure upstream of the extrusion dies of the two heads, registering the difference in pressure between the two heads, using the registered difference in pressure to generate a command signal for applying heat to the molten polymer upstream of the extrusion die of the head to be controlled in proportion to the pressure difference thus established in order to reduce the viscosity of the molten polymer flowing therein and thus equalize the overall output of the two heads.

3. A method of controlling the molten polymer output of the extrusion heads of extrusion apparatus having a plurality of extrusion heads provided with core members and dies which comprises cooling the core member of each head, selecting one of the extrusion heads as a reference head and the remainder of the heads to be the extrusion heads to be controlled, applying heat to the exterior positions of the head and die combinations, continuously measuring the pressure of said heads and regulating the temperature of the cores and head and die combinations of the heads to be controlled proportionately to the difference in pressure between the reference head and the heads to be controlled whereby the viscosity of the molten polymer flowing therein is either depressed or raised to equalize the overall output of the head.

4. A process for controlling the molten polymer outputs of the extrusion heads in an extrusion apparatus having a plurality of extrusion heads whereby to provide generally equal output from the heads thereof, which comprises selecting one of said extrusion heads as a reference head with the remainder of the heads being the extrusion heads to be controlled, continuously measuring the pressure in each said head upstream of the extrusion die thereof, and activating heat exchanging means associated with each said controlled head in response to a command signal generated from use of the difference in the pressure in such controlled head and the pressure in said reference head whereby the viscosity of the molten polymer flowing therein is either depressed or raised to equalize the overall output of the heads.

References Cited

UNITED STATES PATENTS

| 3,642,402 | 2/1972 | Hutchinson et al. | 425—144 |
| 3,002,226 | 10/1961 | Warthen | 264—40 X |
| 3,341,388 | 9/1967 | Bunyea | 264—40 X |
| 3,524,221 | 8/1970 | Jones | 264—40 X |
| 3,683,160 | 8/1972 | Windley | 264—40 X |

OTHER REFERENCES

Bernhardt, Ernest C., edt., "Processing of Thermoplastic Materials," New York, Reinhold, © 1959, pp. 204–226; 243–248 (Spe. Plastics Engineering Series).

PHILIP E. ANDERSON, Primary Examiner

U.S. Cl. X.R.

264—68, 98, 176 R; 425—144, 145

UNITED STATES PATENT OFFICE
CERTIFICATE OF CORRECTION

Patent No. 3,819,777   Dated June 25, 1974

Inventor(s) L. Vermeerbergen

It is certified that error appears in the above-identified patent and that said Letters Patent are hereby corrected as shown below:

Column 1, line 58, "filiere" should read --extrusion die--.
Column 4, line 28, "head" should read --heads--.

Signed and sealed this 22nd day of October 1974.

(SEAL)
Attest:

McCOY M. GIBSON JR.
Attesting Officer

C. MARSHALL DANN
Commissioner of Patents